United States Patent
Wessling (10) Patent No.: US 11,775,468 B2
(45) Date of Patent: Oct. 3, 2023

(54) METHOD FOR DATA TRANSMISSION BETWEEN A PERIPHERAL DEVICE AND A DATA ACQUISITION UNIT, PERIPHERAL DEVICE AND DATA ACQUISITION UNIT

(71) Applicant: Phoenix Contact GmbH & Co. KG, Blomberg (DE)

(72) Inventor: Klaus Wessling, Bueckeburg (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 89 days.

(21) Appl. No.: 17/060,204

(22) Filed: Oct. 1, 2020

(65) Prior Publication Data
US 2021/0103546 A1     Apr. 8, 2021

(30) Foreign Application Priority Data
Oct. 2, 2019  (DE) ............... 10 2019 126 690.4

(51) Int. Cl.
| | | |
|---|---|---|
| G06F 13/42 | (2006.01) | |
| G06F 13/38 | (2006.01) | |
| G06F 9/4401 | (2018.01) | |
| G06F 13/40 | (2006.01) | |

(52) U.S. Cl.
CPC ........ G06F 13/4221 (2013.01); G06F 9/4401 (2013.01); G06F 13/387 (2013.01); G06F 13/409 (2013.01); G06F 13/4068 (2013.01)

(58) Field of Classification Search
CPC .... G06F 13/00; G06F 13/4221; G06F 13/387; G06F 13/4068; G06F 13/409
See application file for complete search history.

(56) References Cited

U.S. PATENT DOCUMENTS

| | | | |
|---|---|---|---|
| 6,038,400 A | 3/2000 | Bell et al. | |
| 6,504,851 B1 | 1/2003 | Abler et al. | |
| 6,647,436 B1 | 11/2003 | Jedrzejewski et al. | |
| 8,095,714 B2 | 1/2012 | Huo et al. | |
| 8,832,347 B2 * | 9/2014 | Chang .................. | G06F 13/42 710/306 |
| 10,089,270 B2 * | 10/2018 | Mooney ............... | G06F 13/385 |

(Continued)

FOREIGN PATENT DOCUMENTS

| | | |
|---|---|---|
| DE | 19703970 A1 | 8/1998 |
| EP | 2274655 A1 | 1/2011 |

(Continued)

*Primary Examiner* — Henry Tsai
*Assistant Examiner* — Kim T Huynh
(74) *Attorney, Agent, or Firm* — LEYDIG, VOIT & MAYER, LTD.

(57) ABSTRACT

A method for transmitting data between a peripheral device and a data acquisition unit, the data acquisition unit having a configurable communication interface via which the data are transmitted according to one of a number of defined communication protocols, includes: carrying out a communication protocol analysis by the peripheral device upon connection to a power supply; and carrying out an adaptation of the configurable communication interface of the peripheral device after detection of a communication protocol, providing a detected communication protocol, used by the data acquisition unit in order to carry out data exchange according to the detected communication protocol.

15 Claims, 5 Drawing Sheets

(56) References Cited

U.S. PATENT DOCUMENTS

| | | | |
|---|---|---|---|
| 2004/0044811 A1* | 3/2004 | Vrancic | G06F 13/387 |
| | | | 710/53 |
| 2014/0156875 A1* | 6/2014 | Saunders | G06F 13/4068 |
| | | | 710/16 |
| 2015/0370751 A1* | 12/2015 | Perrine | G06F 13/4252 |
| | | | 710/106 |
| 2016/0026596 A1* | 1/2016 | Klein | G06F 13/4068 |
| | | | 710/313 |
| 2018/0285307 A1* | 10/2018 | Willis | G06F 13/4234 |

FOREIGN PATENT DOCUMENTS

| | | |
|---|---|---|
| WO | WO 2009124780 A1 | 10/2009 |
| WO | WO 2017153847 A1 | 9/2017 |

\* cited by examiner

| IF_mode_0 | IF_mode_1 | IF_mode_2 | IF_mode_3 | IF_mode_4 | IF_mode_5 | IF_mode_6 | ... |
|---|---|---|---|---|---|---|---|
| input tristate | backplane_ID1 | backplane_ID1 | backplane_ID1 | backplane_ID1 | backplane_ID1 | backplane_ID1 | X |
| input tristate | input tristate | input tristate | USART1_RX input | USART1_RX input | USART1_RX input | USART1_RX input | X |
| input tristate | input tristate | input adr_0 | USART1_RX output | USART1_RX output | USART1_RX output | USART1_TX output | X |
| input tristate | input C/D state | backplane_ID2 | backplane_ID2 | backplane_ID2 | backplane_ID2 | backplane_ID2 | X |
| input tristate | input tristate | synch input | synch input | synch output | synch input | synch input | X |
| input tristate | SPI_CS | SPI_CS | SPI_CS | SPI_CS | adr_3 input | adr_3 input | X |
| input tristate | SPI_SCLK | SPI_SCLK | SPI_SCLK | SPI_SCLK | adr_4 input | adr_4 input | X |
| input tristate | SPI_MISO | SPI_MISO | SPI_MISO | SPI_MISO | adr_5 input | input tristate | X |
| input tristate | SPI_MOSI | SPI_MOSI | SPI_MOSI | SPI_MOSI | adr_6 input | input tristate | X |
| input tristate | output Appl_Miss_1 | input adr_1 | adr_1 input | adr_1 input | adr_1 input | adr_1 input | X |
| input tristate | output Appl_Miss_2 | input adr_2 | adr_2 input | adr_2 input | adr_2 input | adr_2 input | X |
| Starting position | SE plugs into AXL SE BPM, is SPI master, communicates and behaves accordingly | SE plugs into a type 1 Block-IO BPM, communicates, behaves accordingly and has three address lines | SE plugs into a type 2 Block-IO BPM, the SE is informed of the assignment/function of the remaining pins via the UART. For example, SE is an SPI slave for cyclic data and has two address lines and a synchronous input | SE plugs into a type 3 Block-IO BPM, the SE is informed of the assignment/function of the remaining pins via the UART. For example, SE is an SPI master for cyclic data and has two address lines and a synchronous output | SE plugs into a type 4 Block-IO BPM, the SE is informed of the assignment/function of the remaining pins via the UART. For example, SE is a Modbus RTU slave, has 6 address lines and a synchronous input | SE plugs into a type 5 Block-IO BPM, the SE is informed of the assignment/function of the remaining pins via the UART. For example, in terms of communication, SE is an IO-link slave and has a synchronous input | |

METHOD FOR DATA TRANSMISSION BETWEEN A PERIPHERAL DEVICE AND A DATA ACQUISITION UNIT, PERIPHERAL DEVICE AND DATA ACQUISITION UNIT

CROSS-REFERENCE TO PRIOR APPLICATION

Priority is claimed to German Patent Application No. DE 10 2019 126 690.4, filed on Oct. 2, 2019, the entire disclosure of which is hereby incorporated by reference herein.

FIELD

The present invention relates to a method for transmitting data between a peripheral device and a data acquisition unit. Both components may be part of an input/output station for a fieldbus system. The invention furthermore relates to a correspondingly designed data acquisition unit and a peripheral device.

BACKGROUND

Communication systems of this type, such as input/output (I/O) stations, are frequently used in production plants since a variety of applications in the production process are possible due to their modular design. A communication system of this type has in particular a processor, a configuration memory, one or more pluggable input and/or output modules (I/O modules), and an internal bus system. The I/O module or modules in this case form an interface via which process data and control data, such as sensor signals and actuator signals, can be transmitted to and received from devices to be controlled.

EP 2 274 655 A1 discloses a communication system having a bus coupler and an internal bus system. The bus subscribers are in particular input/output modules which can be used in the fieldbus field.

U.S. Pat. No. 6,647,436 B1 discloses an interface which can be operated in various operating modes.

A configurable hardware platform which can be used in the fieldbus field is known from WO 2017/153847 A1.

The input/output modules are typically designed to be pluggable in the fieldbus field. However, they are equipped with a communication interface which is fixed. Problems arise in the field if various input/output modules having different communication interfaces are to be used in an input/output station.

SUMMARY

In an embodiment, the present invention provides a method for transmitting data between a peripheral device and a data acquisition unit, the data acquisition unit having a configurable communication interface via which the data are transmitted according to one of a number of defined communication protocols, the method comprising: carrying out a communication protocol analysis by the peripheral device upon connection to a power supply; and carrying out an adaptation of the configurable communication interface of the peripheral device after detection of a communication protocol, providing a detected communication protocol, used by the data acquisition unit in order to carry out data exchange according to the detected communication protocol.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 4 is a detailed table according to the invention, with a number of possible communication protocols whose number is not limited to the listed communication protocols in the table.

DETAILED DESCRIPTION

In an embodiment, the present invention increases the flexibility in reusing different input/output modules in input/output stations.

In an embodiment, the present invention provides a method for transmitting data between a peripheral device and a data acquisition unit as described herein, a peripheral device as described herein, and a data acquisition unit as described herein.

The description herein contains advantageous developments and improvements of the invention corresponding to the following description of these measures.

In one aspect, the invention relates to a method for transmitting data between a peripheral device and a data acquisition unit, wherein the data acquisition unit has a communication interface via which the data are transmitted according to one of a number of defined communication protocols. In order to detect the communication protocol for which the data acquisition unit was designed, a communication protocol analysis is carried out by the peripheral device upon connection to the power supply and, after detection of the communication protocol used by the data acquisition unit, an adaptation of the configurable communication interface of the peripheral device is carried out in order to carry out data exchange with the data acquisition unit according to the detected communication protocol. The achievement offers considerable advantages. One field of application of the invention exists in fieldbus systems in which data are transmitted from a controller (PLC) to input/output stations or are received from the input/output stations. Typically, an input/output station includes a fieldbus coupler and one or more input/output modules. The input/output modules relate to the peripheral devices in the sense of the described achievement. The input/output modules are plugged into corresponding slots of the input/output station. Since the input/output modules are designed for different system providers, they are usually set to a defined communication protocol according to which they may exchange data with the fieldbus coupler of the input/output station. Different communication protocols may also be used by one system provider, depending on the product generation. This poses a problem if the input/output station is set to a different communication protocol (internal system bus). The achievement now offers the advantage that the various input/output modules may be used in one input/output station. All input/output modules that are used in the input/output station thus do not need to be designed for the same communication protocol. The peripheral device in the form of the input/output module can be variably adjusted with regard to the communication protocol to be run between input/output module and data acquisition device. The communication from the possibly only interposed data acquisition device to the fieldbus coupler may take place according to the internal system bus communication protocol selected for the input/output station, because the input/output module can adapt to the different communication protocols. This achievement thus also offers advantages with regard to a system freedom of the usable peripheral devices. A separation of system bus and the peripheral devices which are plugged into a station is thereby enabled for the first time. The customer is offered the advantage that the purchased peripheral devices may be used much more flexibly in the different stations. The sustainability of the peripheral devices is also increased since they can also be reused in newer stations.

In an embodiment, it is advantageous if the communication protocol analysis is carried out in the peripheral device with the aid of a table into which the signal states of a number of contacts of a plug connection between data acquisition unit and peripheral device are entered for the various defined communication protocols.

It is likewise advantageous if data are furthermore entered into the table for a further number of contacts of the plug connection, said data being transmitted via the lines connected to the further contacts, wherein the data relate to a number of data words which contain a communication protocol type identification. Virtually any number of different communication protocol types can thus be differentiated.

In another variant, it is advantageous for the method if the assignment of specific contacts of the plug connector is indicated with the number of data words. This makes it unnecessary to define different types of communication protocols.

Finally, it is furthermore advantageous if the number of data words represents the function of the peripheral device and of the data acquisition unit with respect to the displayed communication protocol, in particular whether in the case of a master/slave communication protocol, the peripheral device or the data acquisition device is to operate in a master or slave operating mode with respect to the bus access to the connected communication bus. This is especially important for master/slave bus protocols.

In another aspect, the invention relates to a peripheral device, wherein the peripheral device has a configurable communication interface to which a data acquisition unit can be connected. For this purpose, the configurable communication interface is provided with a microcontroller having general-purpose inputs/outputs, wherein the microcontroller, upon connection of the peripheral device to the power supply, starts a bootloader program which carries out an analysis of the signal states on a number of specific general-purpose inputs/outputs, and depending thereon loads the interface software that is required in order to carry out data transmission according to the communication protocol whose signal behavior was detected in the analysis of the signal states. The interface software is part of the firmware of the peripheral device. For this purpose, a standard microcontroller which has what are known as general-purpose inputs/outputs GPIO may be used as the microcontroller.

In one embodiment, it is advantageous that the peripheral device has a connector, in particular a plug connector, which may be plugged into the data acquisition unit, wherein the plug connector has a number of contacts to which the general-purpose inputs/outputs of the microcontroller are connected. Other contacts of the connector are permanently allocated, such as for the power supply, protective earth etc.

In the analysis of the signal states, the signal states of specific individual contacts are advantageously detected, and a selection of the interface software to be loaded on the part of the peripheral device takes place as a function thereof. This embodiment is already sufficient to be able to select from a few communication protocols.

In order to be able to select a greater number of communication protocols, it is advantageous if the signal states of the specific individual contacts are detected during the analysis of the signal states and data acquisition at other specific individual contacts of the plug connector takes place as a function thereof, and a selection of the interface software to be loaded takes place as a function thereof. Data are thus transmitted via the other individual contacts. This may be limited to a small number of data words or more. Depending on how many data words are transmitted in the second protocol analysis phase, any number of protocols can thus be differentiated. With two bytes as a protocol type identification, 65536 different protocols can already be differentiated.

In order to adapt the achievement for use in fieldbus systems, it is advantageous if the data acquisition unit is designed as an intermediate module which is designed on the one hand for connection to an internal system bus of an input/output station which is used for data acquisition and data output in a fieldbus system, wherein the data acquisition unit has a second connector, in particular a plug connector, via which the connection to the internal system bus of the input/output station can be established. It is thus possible to modernize even older input/output stations in that they may be equipped with intermediate modules into which a newer input/output module may then in turn be plugged.

Finally, an advantageous embodiment of a peripheral device exists in that the peripheral device is designed as an input/output module of an input/output station for data acquisition and data output in a fieldbus system.

A further aspect of the invention relates to a data acquisition unit having a communication interface via which the data can be transmitted to and from the peripheral device according to one of a number of defined communication protocols. The communication interface is in this case designed such that it outputs specific signal states and/or specific data to a number of specific inputs/outputs of the communication interface in order to enable a communication protocol detection on the part of a connectable peripheral device through protocol analysis. The data acquisition unit should show specified behavior at individual contacts so that the peripheral device can carry out the communication protocol detection. The principle of system freedom and the desired flexibility and reusability are enabled in that both components, data acquisition unit and peripheral device, cooperate in this way.

For this purpose, it is likewise advantageous if the communication interface is designed such that it applies specific static signal states to a number of specific inputs/outputs of the communication interface and outputs data at specific other inputs/outputs, wherein the data relate to a number of data words which contain a communication protocol type identification.

Furthermore, it is advantageous if the data acquisition unit has a connector, in particular a plug connector, via which the peripheral device can be connected to the data acquisition unit, and the number of data words indicates the assignment of specific contacts of the connector.

In addition, it is advantageous if the number of data words represents the function of the peripheral device with respect to the indicated communication protocol, in particular whether in the case of a master/slave communication protocol, the peripheral device or the data acquisition unit operates in a master or slave operating mode with respect to the bus access to the connected communication bus.

The present specification illustrates the principles of the disclosure according to the invention. It is thus understood that those skilled in the art will be able to design various embodiments that, although not explicitly described herein, embody principles of the disclosure according to the invention and are likewise to be protected in its scope.

Figure 1:
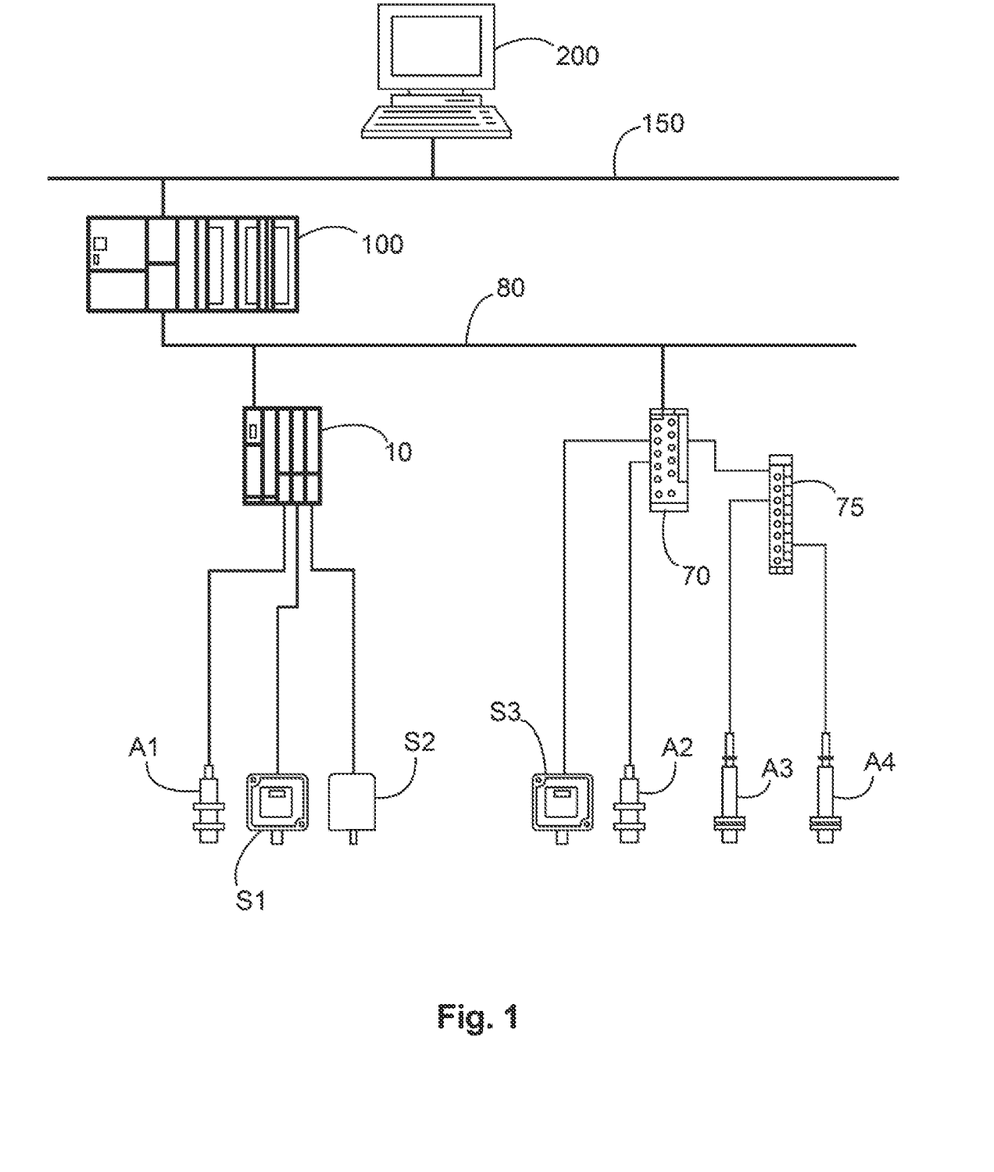
FIG. 1 is a system overview of a machine or plant controller with fieldbus system according to the prior art.

FIG. 1 shows a system overview for a machine or plant controller which is based on the use of a fieldbus system. The fieldbus is denoted by the reference number 80. It is connected to the machine or plant controller 100. This controller 100 is typically placed in the manufacturing hall. It corresponds to an industrial PC, which is often designed as a PLC, i.e., as a programmable logic controller. The control programs are transmitted to the controller 100 via a further network 150 which may, for example, be designed as an Ethernet network, in particular an Industrial Ethernet network. The development of the control programs that are executed by the controller 100 typically occurs apart from the manufacturing hall, in an office complex. Reference numeral 200 denotes a projection computer. The software engineer develops the control programs with this projection computer 200. The completed control programs are transmitted to the controller 100 via the network 150. The various process or plant data pass to the controller 100 via the fieldbus 80. Conversely, the various control data are transmitted from the controller 100 to the corresponding machine or plant parts. What are known as input/output stations 10 are connected to the fieldbus 80 for this purpose. These are equipped with a fieldbus coupler and with various input/output modules to which the various sensors S1, S2 and actuators A1 are connected in turn. FIG. 1 furthermore shows a separate input/output unit 70 which is not of modular design. A sensor S3 and an actuator A2 are connected to this unit. Also connected thereto is a switching unit 75 to which further actuators A3, A4 are connected.

Figure 2:
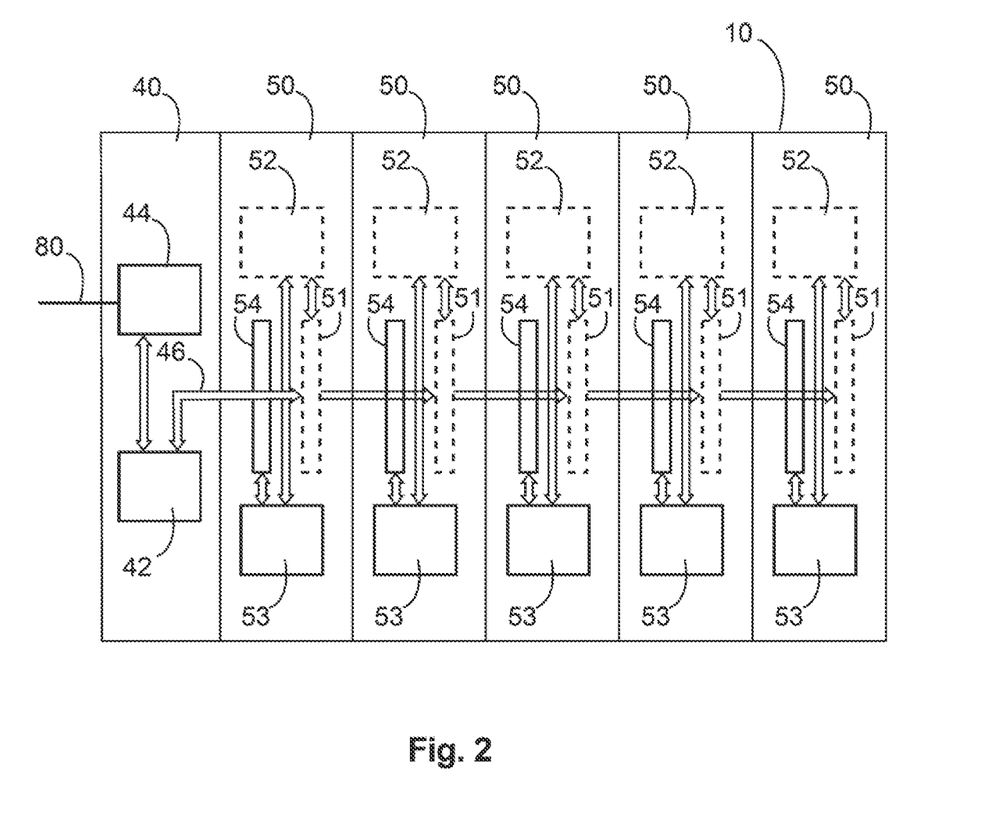
FIG. 2 is an input/output station of a fieldbus system with fieldbus coupler and a number of intermediate modules.

FIG. 2 schematically shows the input/output station 10, which in a full design may have five pluggable input and/or output modules (I/O modules), and a fieldbus coupler 40. The fieldbus coupler 40 includes a fieldbus interface 44 and a system bus interface 42 connected to the internal system bus 46. Five intermediate modules 50 are also connected to the system bus 46.

Each of the intermediate modules 50 is equipped with a configurable communication interface 53. The communication interface 53 is equipped with microcontrollers, as will be discussed in more detail below. Reference numeral 54 denotes a first plug connector. An input/output module can be plugged into this plug connector. The intermediate module 50 includes another, second plug connector 51. The intermediate module 50 is therewith connected to the internal system bus 46 of the input/output station 10. The intermediate module 50 is thus plugged into the base carrier of the input/output station 10, in which the system bus 46 also runs. In addition, the intermediate module 50 has a communication interface 52 for the internal system bus 46. The communication interface 52 may be provided as a separate chip in the intermediate module 50. In another variant, the communication interfaces 52 and 53 may both be integrated on a common chip.

Figure 3:
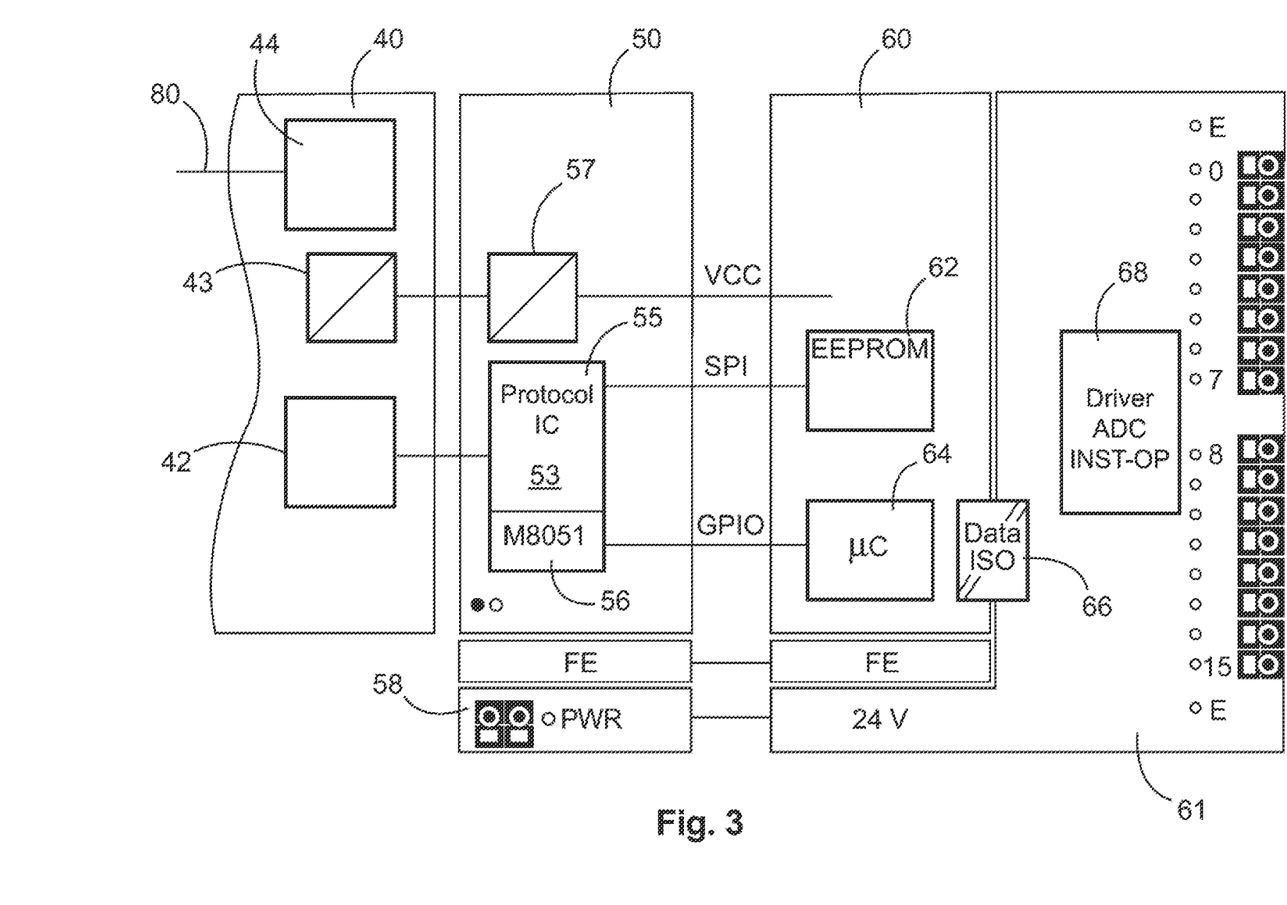
FIG. 3 is a detailed block diagram of an input/output station of a fieldbus system according to the invention with fieldbus coupler, intermediate module, and an input/output module.

FIG. 3 shows the more detailed design of the input/output station 10. Identical reference numerals denote the same components as in FIGS. 1 and 2. In addition to the interfaces 42 and 44, the fieldbus coupler 40 has a voltage supply unit 43 which also supplies voltage to additional components of the input/output station 10. For this purpose, the corresponding supply lines are provided in the base carrier of the input/output station 10. The intermediate module 50 has a protocol component 53 which contains the M8051-type microcontroller. An input/output module 60 is plugged into the plug connector 54 of the intermediate module 50. Said input/output module is equipped with a nonvolatile memory 62 and a microcontroller 64. Reference number 66 denotes an interface 66, which can also be designed to be galvanically isolated, for the I/O peripheral which also located on the input/output module 60 and may be supplied via a special power supply 58. The input/output module contains various luminous displays which are to be monitored by the operating personnel in the field. The corresponding driver component 68 is likewise shown in FIG. 3. Shown in the lower part of FIG. 3 is the special power supply 58 which supplies power to the plug-in module 61. Moreover, a protective earth connection FE between intermediate module 50 and input/output module 60 is also shown.

The microcontroller M8051 has the already described general-purpose inputs/outputs to which the contacts of the plug connector are guided, the signal states of which must be detected within the framework of the communication protocol analysis. Other contacts of the plug connector 54 are connected to the other inputs/outputs of the protocol component 53. The following table lists all contacts of the plug connector 54. Some contacts of the plug connector are fixed, for example the contacts to the voltage supply and for the protective earth FE. The general-purpose inputs/outputs GPIO are connected to the communication interface 53, which here is composed of a protocol chip 55 and its coprocessor 56. In the aspect of this variant of the universal peripheral interface, the contacts with gray background are permanently defined.

TABLE 1

| | EdgeCard | | |
|---|---|---|---|
| Assignment | PIN | PIN | Assignment |
| 24 V | 1 | 2 | FE |
| 24 V | 3 | 4 | . |
| 24 V | 5 | 6 | . |
| 24 V | 7 | 8 | . |
| . | 9 | 10 | GPIO |
| GND | 11 | 12 | 5 V |
| GND | 13 | 14 | GPIO |
| GND | 15 | 16 | GPIO |
| GND | 17 | 18 | GPIO |
| . | 19 | 20 | Reset_Out_n |
| . | 21 | 22 | LGND |
| . | 23 | 24 | GPIO |
| LGND | 25 | 26 | GPIO |
| 3.3 V | 27 | 28 | LGND |
| EE_CS | 29 | 30 | GPIO |
| EE_SCLK | 31 | 32 | GPIO |
| EE_MOSI | 33 | 34 | LGND |
| EE_MISO | 35 | 36 | GPIO |
| LGND | 37 | 38 | GPIO |
| GPIO | 39 | 40 | LGND |

The remaining contacts (see Table 2) are the general-purpose inputs/outputs GPIO. These GPIO are flexible with regard to their signal direction (TTL input, TTL output) and may be linked internally in the microcontroller with alternative functions. An example of a linking to functions of a USART interface, an SPI interface, and an I2C interface are listed in Table 2. This property is exploited in the invention.

TABLE 2

| EdgeCard | Microcontroller | |
|---|---|---|
| PIN no. | TTL | Alternate function |
| 10 | GPIO | USART1_RTS |
| 16 | GPIO | USART1_RX |
| 18 | GPIO | USART1_TX |
| 24 | GPIO | USART1_CTS |
| 26 | GPIO | USART1_CK |
| 30 | GPIO | SPI1_NSS |
| 32 | GPIO | SPI1_SCK |
| 36 | GPIO | SPI1_MISO |
| 38 | GPIO | SPI1_MOSI |
| 14 | GPIO | I2C2_SDA |
| 39 | GPIO | I2C2_SCL |

Through the use of the microcontroller 64, it is possible to configure the communication interface 53 upon connection of the input/output module 60. This happens in that different transmission protocols and "roles" (master or slave) may be used and combined via the contacts with "flexible function" and by analyzing the signal states and/or their protocol mechanisms. The communication rules establish the "receiver" in the form of the intermediate module 50 to which the input/output module 60 can be adjusted.

Shown in FIG. 4 is a further table which shows in detail the evaluation of the various general-purpose inputs/outputs GPIO in the communication protocol analysis after connection of the power supply. IF_mode_0 is an output state in which all multipurpose inputs/outputs GPIO are adjusted to TTL input. In IF_mode_1, the input level is evaluated upon contact with number 10. If the level is logically at zero, it can already be decided that the communication interface is to operate as an SPI interface, wherein the input/output module 60 is to operate as an SPI master. The assignment of the other general-purpose inputs/outputs GPIO is indicated in the table.

For IF_mode_2, it results that the level is adjusted logically to one upon contact with number 10. This means that the level at contact number 24 is also evaluated. If a logical zero level is present there, a configuration of the interface takes place in the form that it is to operate as an SPI interface in which the input/output module 60 is to operate as an SPI slave.

In IF_mode_3, the level is logically adjusted to one upon contact with number 10. It then results, however, that a level of logical one is present upon contact with number 24. This is interpreted by the bootloader software in such a way that the type of communication protocol has not yet been unambiguously determined. Data exchange then additionally takes place via the USART contacts with the numbers 16+18. The data indicate the assignment of the other general-purpose inputs/outputs. Their assignment is indicated in the table. The other variants IF_mode_4 to IF_mode_6 behave exactly the same. The exact interface configuration on the part of the intermediate module 50 is communicated by evaluating the data that are exchanged via the USART contacts 16+18. The input/output module 60 adapts thereto by loading the corresponding interface software.

Due to the possibilities of the microcontroller 64 in conjunction with the correspondingly designed firmware, various known, or even new, proprietary protocols may be used.

Figure 5:
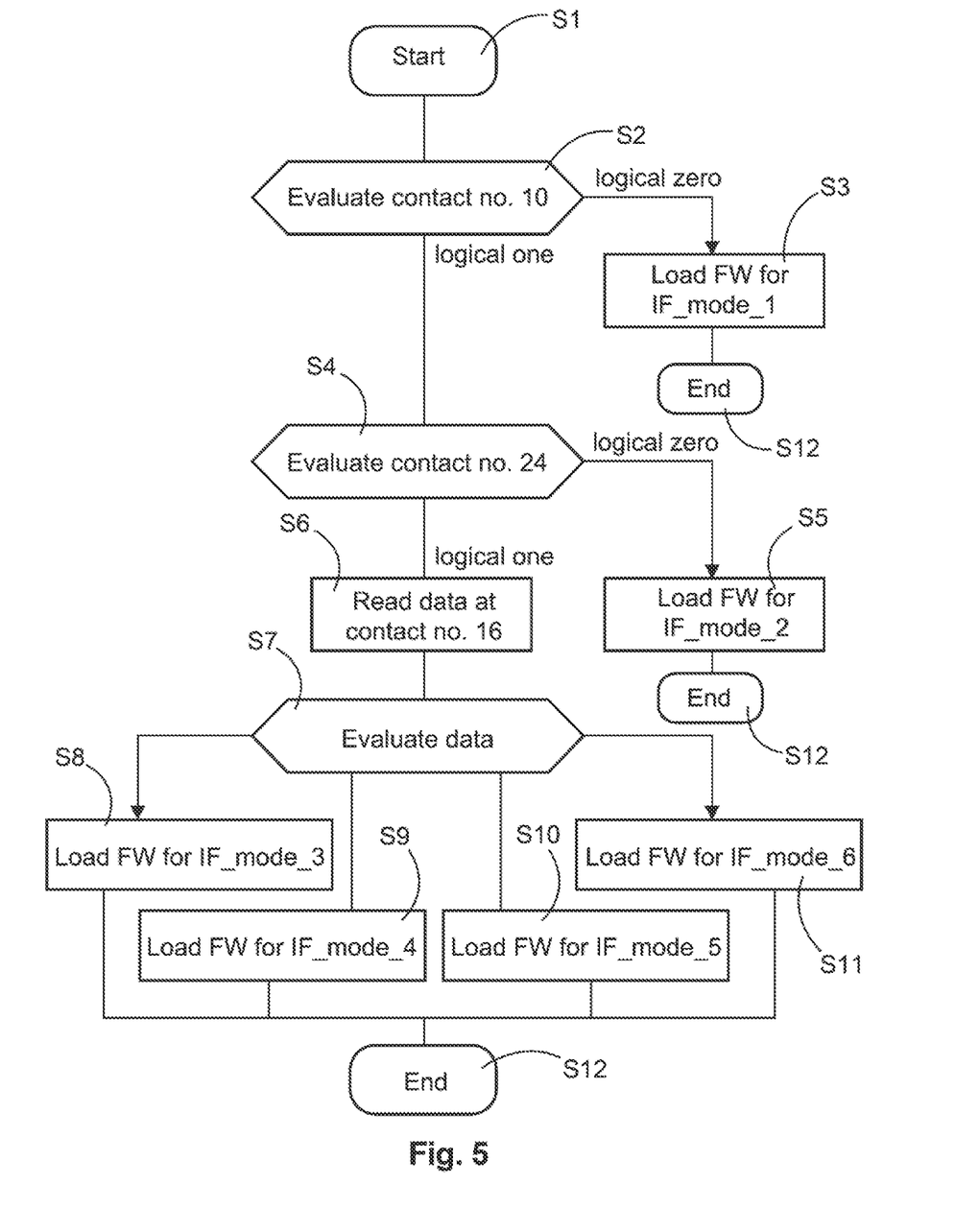
FIG. 5 is a flow diagram for a program in the firmware of the intermediate module with which the communication protocol analysis may be carried out.

In the following, the behavior of the firmware of the input/output module 60 is explained with the aid of the flow diagram in FIG. 5. It is a flowchart for a bootloader program that is started upon connection of the power supply of the input/output module 60. The bootloader program starts in step S1. In step S2, an evaluation occurs of the signal states at the contact with number 10. If a logical zero level is present there, the interface software for IF_mode_1 is loaded in step S3. If a logical one level is present there, the signal state at the contact with number 24 is evaluated in step S4. If a logical zero level is present there, the interface software for IF_mode_2 is loaded in step S5.

If a logical one level was found in step S4, data are exchanged via the USART contacts 16+18 in step S6. The evaluation takes place in step S7. Thereafter, the loading of the matching interface software takes place in one of steps S8 to S11. Either the software for IF_mode_3, IF_mode_4, IF_mode_5, or IF_mode_6 may be loaded. The bootloader program ends after loading the interface software in step S12.

It should be understood that the proposed method and the associated devices may be implemented in various forms of hardware, software, firmware, special processors, or a combination thereof. Special processors may include application-specific integrated circuits (ASICs), reduced instruction set computers (RISCs), and/or field programmable gate arrays (FPGAs). The proposed method and the device are preferably implemented as a combination of hardware and software. The software is preferably installed as an application program on a program storage device. Typically, it is a computer platform-based machine having hardware, such as one or more central units (CPUs), direct access memory (RAM), and one or more input/output (I/O) interface(s). Moreover, an operating system is typically installed on the computer platform. The various processes and functions that were described herein may be part of the application program or a part that is executed via the operating system.

The invention is not limited to the exemplary embodiments described here. There is room for various adaptations and modifications which those skilled in the art would, on the basis of their expertise, also regard as belonging to the disclosure.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

Input/output station 10
Fieldbus coupler 40
System bus interface 42
Fieldbus interface 44
Internal system bus 46
Intermediate module 50
First plug connection 51
System bus interface 52
Configurable communication interface 53
Second plug connection 54
Protocol chip 55
Microcontroller 56
Voltage supply 57
Additional power supply 58
Peripheral device 60
Plug-in module 61
Memory 62
I/O unit microcontroller 64
ISO interface 66
Driver component 68
Input/output unit 70
Switching unit 75
Fieldbus 80
Controller station 100
Network 150
Projection computer 200
1st sensor S1
2nd sensor S2
3rd sensor S3
1st actuator A1
2nd actuator A2
3rd actuator A3
4th actuator A4
Various steps of the intermediate module firmware S1-S12

The invention claimed is:

1. A method for transmitting data between a peripheral device and a data acquisition unit, the data acquisition unit having a configurable communication interface via which the data are transmitted according to one of a number of defined communication protocols, the method comprising:
carrying out a communication protocol analysis by the peripheral device upon connection to a power supply; and
carrying out an adaptation of the configurable communication interface of the peripheral device after detection of a communication protocol, providing a detected communication protocol, used by the data acquisition unit in order to carry out data exchange according to the detected communication protocol.

2. The method according to claim 1, wherein the communication protocol analysis is carried out in the peripheral device with aid of a table in which signal states of a number of contacts of a plug connection between data acquisition unit and peripheral device are entered for the defined communication protocols.

3. The method according to claim 2, wherein data are furthermore entered into the table for a further number of contacts of the plug connection, the data being transmitted via lines connected to the further contacts, and wherein the data relate to a number of data words which contain a communication protocol type identification.

4. The method according to claim 3, wherein the number of data words indicates an assignment of specific contacts of the plug connector.

5. The method according to claim 3, wherein the number of data words represents a function of the peripheral device with respect to the detected communication protocol, wherein in case of a master/slave communication protocol, the peripheral device or the data acquisition unit is to operate in a master or slave operating mode with respect to a bus access to a connected communication bus.

6. A peripheral device, comprising:
a configurable communication interface to which a data acquisition unit is connectable, the configurable communication interface comprising a microcontroller having general-purpose inputs/outputs,
wherein the microcontroller, upon connection of the peripheral device to a power supply, is configured to start a bootloader program which carries out an analysis of signal states on a number of specific general-purpose inputs/outputs, and depending thereon loads interface software that is required in order to carry out data transmission according to a communication protocol whose signal behavior was detected in the analysis of the signal states.

7. The peripheral device according to claim 6, further comprising a plug connector which is pluggable into the data acquisition unit,
wherein the plug connector has a number of contacts to which the general-purpose inputs/outputs of the microcontroller are connected.

8. The peripheral device according to claim 7, wherein, in the analysis of the signal states, the signal states of specific individual contacts are detected, and a selection of the interface software to be loaded takes place as a function thereof.

9. The peripheral device according to claim 8, wherein the signal states of specific individual contacts are detected during the analysis of the signal states, and data acquisition at other specific individual contacts of the plug connector takes place as a function thereof, and a selection of the interface software to be loaded takes place as a function thereof.

10. The peripheral device according to claim 6, wherein the peripheral device comprises an input/output module of an input/output station for data acquisition and data output in a fieldbus system.

11. A data acquisition unit, comprising:
a communication interface via which data is transmittable to and from the data acquisition unit according to one of a number of defined communication protocols, the communication interface being configured so as to output specific signal states and/or specific data at a number of specific inputs/outputs of the communication interface in order to enable a communication protocol detection by a connectable peripheral device through protocol analysis.

12. The data acquisition unit according to claim 11, wherein the data is transmittable to and from the data acquisition unit according to one of a number of established communication protocols,
wherein the communication interface is configured to apply specific static signal states to a number of specific inputs/outputs of the communication interface and outputs data at specific other inputs/outputs, and wherein the data relate to a number of data words which contain a communication protocol type identification to provide an indicated communication protocol.

13. The data acquisition unit according to claim 12, wherein the data acquisition unit has a plug connector via which the data acquisition unit is connectable to the peripheral device, and the number of data words indicates an assignment of specific contacts of the plug connector.

14. The data acquisition unit according to claim 12, wherein the number of data words represents a function of the data acquisition unit with respect to the indicated communication protocol,
  wherein whether the data acquisition unit or the peripheral device operates in a master or slave operating mode or in a master/slave communication protocol with respect to a bus access to a connected communication bus.

15. The data acquisition unit according to claim 11, wherein the data acquisition unit comprises an intermediate module which is pluggable into an internal system bus of an input/output station which serves for data acquisition and data output in a fieldbus system, and
  wherein the intermediate module has a second plug connector via which the connection to the internal system bus of the input/output station is configured to be established.

* * * * *